March 12, 1968

J. W. HENDRY 3,372,434

MOUNTING OF EXTRUDER-FEEDER ONTO INJECTION
CYLINDER WITH RELIEF FOR HEAT EXPANSION

Filed May 27, 1965

INVENTOR.
JAMES W. HENDRY

BY
Woodhams, Blanchard and Flynn
ATTORNEYS

March 12, 1968  J. W. HENDRY  3,372,434
MOUNTING OF EXTRUDER-FEEDER ONTO INJECTION
CYLINDER WITH RELIEF FOR HEAT EXPANSION
Filed May 27, 1965  2 Sheets-Sheet 2

INVENTOR.
JAMES W. HENDRY
BY
Woodhams, Blanchard and F. Lynn
ATTORNEYS

United States Patent Office 3,372,434
Patented Mar. 12, 1968

3,372,434
MOUNTING OF EXTRUDER-FEEDER ONTO
INJECTION CYLINDER WITH RELIEF FOR
HEAT EXPANSION
James W. Hendry, Scottsburg, Ind., assignor to Borg-Warner Corporation, Chicago, Ill., a corporation of Illinois
Filed May 27, 1965, Ser. No. 459,222
7 Claims. (Cl. 18—30)

ABSTRACT OF THE DISCLOSURE

A plasticizing machine including an elongated screw housing and guide means for axially slideably mounting one end of the housing on a fixed base. The housing is provided with a longitudinal chamber. One end of a plasticizing screw is fixed for rotation with respect to the base, the screw being rotatably and slideably received in the chember. Inlet and outlet openings communicate with the chamber adjacent the opposite ends of the screw, the openings supplying material to be plasticized and removing plasticized material from the chamber, respectively. A conduit connects with the outlet opening and is provided with a slip joint to allow axial expansion of the conduit. The other end of the conduit is fixed with respect to the base and communicates with a suitable consuming device.

This invention relates to a machine for plasticizing and feeding plastic material and more specifically relates to a plasticizing and feeding machine including means for accommodating internal expansion and contraction due to temperature changes.

In the past, the screw, screw opening and outlet passage of such machines were relatively short and longitudnal exing the granules and thereby heating same. One widely known type of device for frictionally working plastic granules comprises an elongated substantially cylindrical screw snugly disposed for rotation within an elongated opening in a suitable housing. Material to be worked is fed into the rotating screw at one end thereof and the flights of the screw impel the material along the length of the screw, the material being frictionally worked between the surface of the screw and of the opening. A suitable outlet passage allows the material so worked to be removed to a suitable consuming device such as a mold extrusion die, accumulator or the like.

In the past, the screw, opening and outlet passage of such machines were relatively short and longitudinal expansion thereof was not materially beyond the magnitude of the manufacturing clearances in the machine. Thus, thermal expansion of the above-named parts occurring as a result of frictional working of the granules and/or movement of the heated plastic material therepast generally did not impair the operation of the machines and hence was generally not a problem in such small machines even where rather close tolerances were used.

It has long been desirable to provide larger machines with close operating tolerances in order to improve accuracy of operation, bearing life, and other features of the above-described prior machines. However, in screw type machines in which the screw is, for example, four to six feet long, the lengths of the screw, housing and the output passage may change substantially between room temperature and a given machine operating temperature. Where manufacturing clearances in a large machine normally do not vary significantly from clearances in smaller machines, it will be seen that the expansion and contraction of parts in large machines may be substantially greater than the clearances provided. Moreover, the parts of the machine upon which the screw, housing and output passage are supported generally do not materially expand or contract since they are not subjected to significant temperature changes. Thus, in large machines, the housing, screw or output passage defining means may be subjected to serious distortion as the machine is heated or cooled to or through a particular temperature range. Such distortion may result, for example, in binding and rapid wear of parts of the machine or may even result in jamming of the screw, leakage in the path of the heated material or other deleterious effects.

Although conventional machines might under favorable circumstances, be designed so that thermal expansion of the machine at a single operating temperature point brings the parts within correct operating tolerances, such is generally unsatisfactory since modern plasticizing machines are often required to work properly at any of a wide range of temperatures, for example, from 200 to 400°. Thus, a large screw machine in which screw and housing cannot freely expand and yet which maintains close operating tolerances will generally not be capable of satisfactory operation through a wide range of temperatures.

Hence, the objects of this invention include:

(1) To provide a machine for plasticizing and feeding plastic material which will operate satisfactorily over a wide range of temperatures extending from room temperature to the highest range of temperatures normally encountered in plasticizing known plastic materials.

(2) To provide a machine, as aforesaid, in which expansion and contraction of heated parts over a relatively wide range substantially exceeding normal machinery clearances is freely allowed without destroying close operating tolerances.

(3) To provide a machine, as aforesaid, the proper operation of which is not limited by thermal expansion of major elongated parts thereof in response to wide temperature fluctuation.

(4) To provide a machine, as aforesaid, in which fixed reference points are established from which expanding parts are allowed to elongate and contract.

(5) To provide a machine, as aforesaid, in which the output portion of the machine remains stationary despite wide temperature variations in plasticizing components of the machine.

(6) To provide a machine, as aforesaid, which costs little or nothing more than conventional machines.

(7) To provide a machine, as aforesaid, which is relatively simple and sturdy in constructon for low manufacturing and maintenance costs and which is capable of feeding a wide variety of consuming devices including molds, extrusion dies and the like with plastic material.

Other objects and purposes of this invention will be apparent to persons acquainted with apparatus of this general type upon reading the following specification and inspecting the accompanying drawings.

Figure 1:
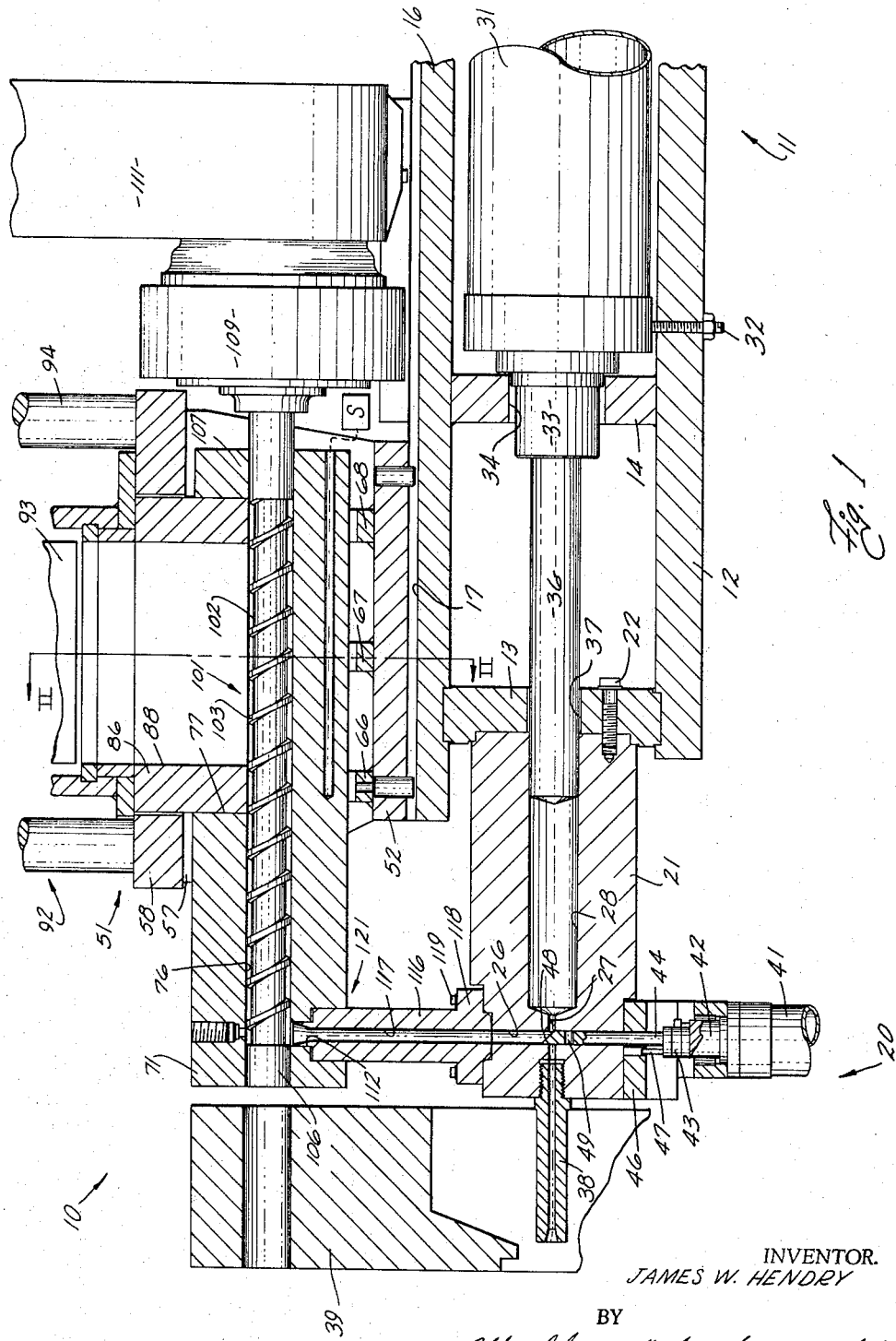
FIGURE 1 is a central cross-sectional view of a plasticizing and feeding machine embodying the invention.

Certain terminology will be used in the following description for convenience in reference only and will not be limiting. The words "upwardly," "downwardly," "rightwardly" and "leftwardly" will designate directions in the drawings to which the reference is made. The words "forwardly" and "rearwardly" will refer to the normal direction of material flow through the machine and to the reverse direction, respectively, forwardly being toward the left through the screw in FIGURE 1. The words "inwardly" and "outwardly" will refer to directions toward and away from, respectively, the geometric center of the device and designated parts thereof. Said terminology will include the words above specifically mentioned, derivatives thereof and words of similar import.

GENERAL DESCRIPTION

In general, the objects and purposes of this invention are met by providing a plasticizing and feeding machine including an elongated screw housing and guide means for axially slideably mounting one end of said housing on a fixed base. The housing is provided with a longitudinal chamber. One end of a plasticizing screw is fixed for rotation with respect to said base, said screw being rotatably and slideably received in said chamber. An inlet opening and an outlet opening communicate with the chamber adjacent the opposite ends of the screw, said openings supplying material to be plasticized and removing plasticized material from the chamber, repectively. A conduit connects with the outlet opening and is provided with a slip joint to allow axial expansion thereof, the remaining end of the conduit being fixed with respect to said base and communicating with a suitable consuming device. The conduit prevents axial movement of the outlet end of the housing with respect to the base. Said guide means further support material feeding means connected to the inlet of the housing.

DETAILED DESCRIPTION

The machine 10 (FIGURES 1 and 2) embodying the invention includes a fixed base generally indicated at 11. The base 11 comprises a table 12 which supports a plurality, here two, of laterally spaced, upstanding webs 13 and 14 which are affixed thereto by any convenient means such as welding. A guide plate 16 is supported atop the webs 13 and 14 in parallelism with the table 12 and is secured to the webs by any convenient means such as welding. An elongated, substantially rectangular guide groove 17 is provided in the upper surface of the guide plate 16.

A plasticized material consuming device generally indicated at 20 is fixed with respect to the base 11. The consuming device may be of any desired type, comprising, for example, a mold, extrusion die or, in the present embodiment, accumulating mechanism. The particular consuming device 20 shown in the present embodiment is substantially similar to that of my copending application Ser. No. 279,539, now U.S. Patent No. 3,288,903, and includes an accumulator block 21. The accumulator block 21 is rigidly affixed to the leftward face of the web 13 by any convenient means here including the screw 22 and extends leftwardly beyond the end of the guide plate 16. The accumulator block 21 includes a pair of intersecting passages 26 and 27. The passage 26 extends substantially vertically through the block 21 adjacent the leftward end thereof. The passage 27 extends substantially horizontally through the block 21 and is radially enlarged to the right of passage 26 to define a chamber 28.

A ram pressure fluid cylinder 31 is disposed between the table 12 and guide plate 16 and is secured to the base 11 by any convenient means here including the screw 32. The ram cylinder 31 includes a piston rod 33 which extends leftwardly through a suitable opening 34 in the web 14 in coaxial alignment with the chamber 28. A ram 36 is secured to and extends leftwardly from the leftward end of the piston rod 33 through an opening 37 in the web 13 said ram 36 being snugly but slideably received within the chamber 28.

The leftward end of the opening 27 in the accumulator block 21 threadedly receives a suitable outlet device. In the particular embodiment of the invention shown, the outlet device comprises a nozzle 38 arranged to feed a suitable mold, not shown, supported upon a platen 39 fixed by any convenient means, not shown, with respect to the base 11.

The consuming device 20 further includes a valve pressure fluid cylinder 41 disposed below the block 21 in coaxial alignment with the opening 26. The valve cylinder 41 is affixed to the block 21 by means of a suitable hanger 46. The piston rod 42 of the valve cylinder 41 is provided at its upper end with horizontally slotted adaptor 43 for receiving the headed lower end of a valve rod 44. The adaptor 43 is provided with an upstanding pin 47 which engages a suitable hole in the hanger 46 to prevent rotation of the piston rod 42 and valve rod 44. The upper end 48 of the valve rod 44 is beveled and faces upwardly and rightwardly. A hole 49 parallel to the opening 27 is provided into the valve rod 44 at a point spaced from the upper end thereof. Thus, when the piston rod 42 is retracted and the valve rod is in its lowermost position of FIGURE 1, the beveled end 48 connects the upper portion of the opening 26 with the rightward portion of the opening 27 and hence with the chamber 28. On the other hand, extension of the piston rod 42 lifts the valve rod 42 to its uppermost position whereat the beveled upper end 48 closes the opening 26 above the opening 27 and the hole 49 is aligned with the rightward and leftward ends of the opening 27 to connect the chamber 28 to the nozzle 38.

An upstanding framework 51 (FIGURES 1 and 2) is slideably supported on the top of the guide plate 16 for reciprocation along the groove 17. The frame 51 comprises a slide plate 52 which is slidably supported atop the guide plate 16. A plurality, here two, of cylindrical pins 53 are fixed to the slide plate 52 and extend downwardly therefrom snugly but slideably into the groove 17. A spaced, parallel pair of generally trapezoidally shaped side walls 56 and 57 extend upwardly from the slide plate 52 and support a preferably horizontal platform 58 in spaced relation above the slide plate 52. Suitable bracing plates 61 and 62 extend outwardly from respective side walls 56 and 57 to assist in supporting the platform 58. The guide plate 52, walls 56 and 57, platform 58 and bracing plates 61 and 62 form the framework 51 and are preferably rigidly held together by any convenient means such as welding.

A plurality, here three, of upwardly opening, generally U-shaped cradle members 66, 67 and 68 extend between and are preferably welded to the walls 56 and 57 and are spaced therealong. A substantially cylindrical and elongated screw housing 71 is supported adjacent its rightward end upon the upper ends of the cradles 66, 67 and 68 and is notched as indicated at 72 to provide downwardly facing shoulders which rest atop the legs 73 of said cradle members. The lower portion of the housing 71 extends downwardly between the legs 73 of the cradles and is spaced above the bight portions 74 thereof. A preferably circularly cylindrical screw chamber 76 extends longitudinally and preferably coaxially through the length of the housing 71. The upper half of the housing 71 is eliminated above the cradles 66, 67 and 68 to provide an axially extended and upwardly opening slot 77. The bottom 78 of the slot 77 is preferably in the horizontal diameter plane of the screw chamber 76. In the preesnt embodiment, the surface 78 is raised at 79 adjacent the periphery of the housing 71, the raised portions 79 having downwardly extending openings 81 which are aligned with corresponding threaded openings 82 in the legs 73 of the cradles 66, 67 and 68. Screws 83 extend downwardly through the openings 81 and threadedly engage the openings 82 to secure the rightward end of the housing 71 to the framework 51.

A rectangular inlet box 86 is snugly received in the slot 77 of the housing 71 and rests upon the bottom surface 78 thereof. The inlet box 86 is fixed to the housing 71 by means of elongated screws 87 which extend downwardly therethrough and threadedly engage the housing 71 on either side of the screw chamber 76. The inlet box 86 extends upwardly through an opening 91 in the platform 58 and is preferably level with the upper surface of said platform. The inlet box 86 has a rectangular inlet or feed opening 88 which extends upwardly from the screw chamber 76 through the upper surface of the inlet box 86. The inlet opening 88 is elongated axially of the screw chamber 76 and corresponds in width to the diameter of said screw chamber.

A feeding device generally indicated at 92 may be carried by the platform 58 for supplying material to be plasticized to the inlet opening 88. In the particular embodiment shown, the feeding device 92 comprises for purposes of illustration only a portion of the preheating construction disclosed in my copending application Ser. No. 471,835. Thus, the present feeding device preferably includes a feed ram 93 actuable by means, not shown, supported on the columns 94 for downward movement into the opening 88 for forcing material to be plasticized into the screw chamber 76.

A plurality of coolant passages 96 extend leftwardly from the rightward end of the housing 71 substantially to the leftward end of the inlet box 86 and is fed by any convenient source of heat control, usually coolant, liquid schematically indicated at S. Similar passages 97 are provided above the center line of the screw chamber 76 and extends along the side walls of the inlet box 86. The coolant passage 96 and 97 assist in cooling and dimensionally stabilizing the housing 71 in the region of the inlet box 86.

Figure 2:
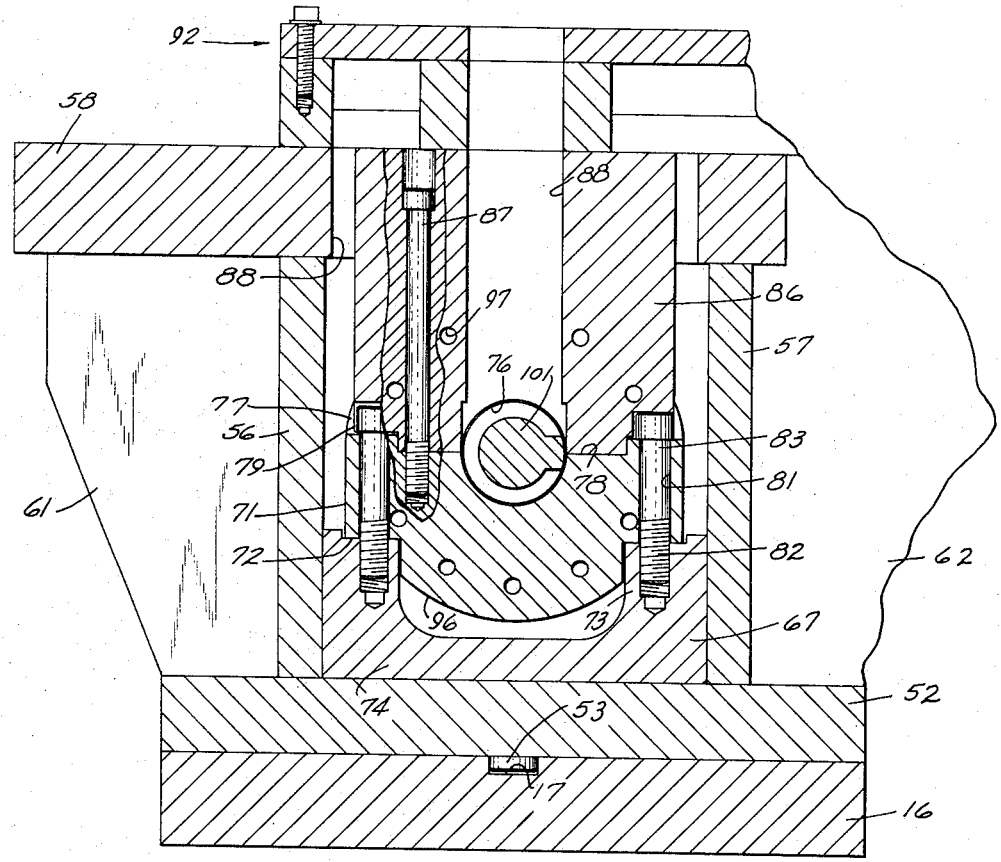
FIGURE 2 is a fragmentary, enlarged and partially broken sectional view substantially taken on the line II—II of FIGURE 1.

An axially elongated, substantially cylindrical screw 101 is snugly but axially slideably disposed in the screw chamber 76 of the housing 71 for rotation therewithin. In the present embodiment, the screw 101 is about four feet long. One or more helical grooves 102 are provided in the periphery of the screw 101 between the rightward end of the inlet opening 88 as seen in FIGURE 1 and a point adjacent the leftward end of the housing 71 for defining a corresponding series of helical flights 103. The rightward and leftward ends of the screw 101 are formed as cylindrical dams 106 and 107 to prevent axial flow of the plasticized material therepast and to assist in radially supporting the screw within the screw chamber. The rightward end of the screw 101 extends beyond the housing 71 and is supported against rightward axial thrust forces by a suitable thrust bearing 109 of any convenient type fixed upon the guide plate 17 by any convenient means, not shown. A suitable rotative motor source 111, here a gear motor, is disposed adjacent the rightward side of the thrust bearing 109 for rotating the screw 101 in a direction to move the material leftwardly from the inlet opening 88 toward the dam 106.

A radial outlet opening 112 extends downwardly through the periphery of the housing from the screw chamber 76 adjacent and to the right of the dam 106. A rigid conduit 116 has a central opening 117 which is coaxially aligned with the outlet opening 112 in the housing 71 and with the vertical opening 26 in the accumulator block 21. The lower end of the conduit 116 is flanged as indicated at 118. The flange 118 is rigidly affixed by screws 119 to the upper face of the block 21. The upper end of the conduit 116 connects to the housing 71 so that the central opening 117 thereof communicates with the outlet opening 112.

Figure 3:
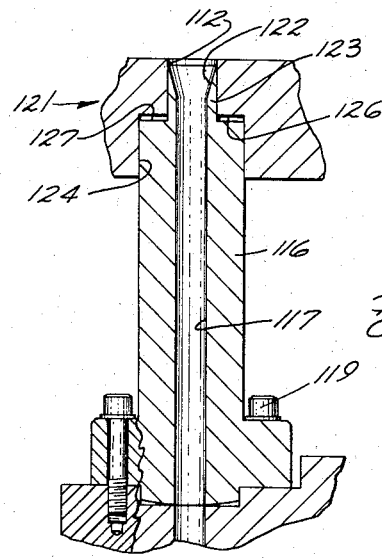
FIGURE 3 is an enlarged fragment of FIGURE 1.

The conduit 116 is provided with an axial slip joint 121 (FIGURE 3) to allow free axial expansion and contraction thereof without disturbing the vertical spacing of the housing 71 and block 21. In the particular embodiment shown, the slip joint 121 is provided at the upper end of the conduit 116. To form the slip joint 121, the upper end 123 of the conduit 116 is reduced in diameter to produce a thin wall section and the upper end of the central opening 117 is upwardly and outwardly curved at 122 to meet the wall of the opening 112 and to allow substantially unimpeded flow of material from the screw chamber 76 into the central opening 117. The upper end 123 is snugly but slideably inserted in the outlet opening 112. The lower portion of the opening 112 is radially enlarged to form a downwardly opening cylindrical recess 124 for snugly but vertically slideably receiving the conduit 116 below the portion 123 thereof. The adjacent radial faces 126 and 127 of the recess 124 and conduit 116 are normally axially spaced to allow expansion and contraction of the conduit 116 along its axis.

OPERATION

The operation of the machine 10 normally begins with the valve rod 44 in its lowered position shown, with the ram 36 either retracted as shown or extended to fill the chamber 28 as desired and with coolant from the source S being supplied to the heat control, usually coolant, passages 96 and 97. To initiate operation of the machine, material to be plasticized is admitted to the inlet opening 88 and urged downwardly to fill the adjacent grooves 102 of the screw 103 by downward force on the feed ram 93. The screw is energized by the motor 111, preferably after the material has been forced into the grooves 102 in order to avoid air pockets in the screw which might lead to charring of the material as it is being plasticized. With the rotation of the screw 102, the material is forced leftwardly by the flights 103 thereof along the screw chamber 76, the peripheral surfaces of the chamber and grooves 102 interacting to frictionally work the material, thereby heating same and, hence, softening and plasticizing said material. The heating of the material normally takes place for the most part to the left of the inlet opening 88. Heat generated by working of the material not only raises the temperature of the material but also of the housing 71 and screw 101 particularly in the region between the inlet and outlet openings 88 and 112. Thus, the housing and screw tend to expand. The expansion is greatest along the maximum dimension of the screw and housing and therefore is greatest in the axial direction. Since the screw is axially fixed only at its rightward end, the leftward end thereof may move axially with respect to the housing 71 to freely allow the screw 101 to expand when heated and to contract when cooled without in any way impairing its ability to rotate within the housing 71 and perform its placticizing function.

The housing 71, on the other hand, is axially fixed at its leftward end by connection to the conduit 116 which is fixed with respect to the block 21. Since the block 21 normally undergoes little or no great expansion, if any, the housing 71 is thus axially fixed with respect to the base 11. Therefore, the leftward end of the housing 71 is fixed axially with respect to the consuming device 20 and, in the particular embodiment shown, to the mold platen 39 thereof. However, the slide plate 52 allows the rightward end of the housing 71 to slide axially and along the groove 17 in the guide plate 16. Thus, axial expansion of the housing 71 rightwardly toward the gear motor 11 is freely allowed. The heat control passages 96 and 97 tend to minimize, or at least control, expansion within the portion of the housing above the cradles 66, 67, and 68 and thereby prevent substantial stresses from building up between the cradles 66, 67 and 68 and the adjoining portion of the housing 71. Since the feeding device 92 including the ram 93 is supported by the framework 51 and thereby moves with the rightward end of the housing 71, alignment of the ram 93 with the inlet opening 88 is in no way affected by axial expansion and contraction of the housing 71. As a result, reliable material feeding to the screw 101 is assured despite great variations in the temperature of the housing.

Material moves forwardly along the screw 101 and reaches the outlet opening 112 in a heated and plastic condition, such material then flows downwardly into the converging portion 122 and central opening 117 of the conduit 116. As material continues to flow, the heated material raises the temperature of the conduit 116. As a result, the conduit 116 tends to expand vertically, the resulting expansion being allowed by the space provided between the radial faces 126 and 127 of the conduit 116 and the recess 124. The longitudinally expanding conduit 116 exerts no radial force on the housing 71 because of the slip joint 121 and, thus, there is no tendency for the housing 71 to become cocked with respect to the axis of the screw and to the base.

In the particular embodiment of FIGURE 1, the high temperature, leftward portion of the housing 71 and the conduit 116 are shown as only moderately elongated for convenience in illustration. It will be understood, however, that the conduit 116 and the leftward portion of the housing 71 may be considerably longer, if desired, without experiencing difficulty from thermal expansion.

Material forced downwardly through the conduit 116 is in the illustrated embodiment deflected by the surface 48 of the valve rod 44 into the ram chamber 28. Should the ram 36 be initially in its leftwardmost position, the cylinder 31 may be de-energized to allow the material entering the chamber to push the ram 36 rightwardly. After a desired amount of material has entered the chamber 28, the cylinders 31 and 41 may be both advanced whereby the passage 49 connects the chamber 28 with the nozzle 38 whereby the leftwardly advancing ram 36 forces the material in the chamber 28 leftwardly out the nozzle 38.

In certain cases, the material entering the chamber 28 may be sufficiently warm as to cause axial or radial expansion of the block 21. Such axial expansion is absorbed by sliding movement of the frame 51 on the guide plate 16 and such radial expansion is absorbed by the slip joint 121. In any event, the radial location of the nozzle 38 is not affected and the axial location thereof remains at least substantially fixed with respect to the platen 39.

Although a particular preferred embodiment of the invention has been disclosed hereinabove for purposes of illustration, it will be understood that variations or modifications thereof which lie within the scope of the appended claims are fully contemplated.

The embodiments of the invention in which an exclusive property or privilege is claimed are defined as follows:

1. In a machine for plasticizing and feeding plastic material, the combination comprising:
   a base;
   an elongated screw housing having an axially aligned screw chamber;
   transverse inlet and outlet openings in communication with said screw chamber at axially spaced locations therein;
   an elongated screw snugly but rotatably disposed in said chamber for moving material from said inlet opening to said outlet opening, said screw being arranged for at least limited axial sliding movement with respect to said housing;
   first means for fixing said housing adjacent said outlet opening against axial movement with respect to said base;
   second means for transversely supporting said housing adjacent said inlet opening and for allowing axial sliding motion of said housing with respect to said base;
   feeding means for supplying said inlet opening with material to be plasticized, said feeding means being supported in fixed relation to said inlet opening;
   drive means for rotatably driving said screw adjacent said inlet opening and for axially fixing the driven portion of said screw with respect to said base;
   whereby independent axial expansion and contraction of said screw and housing due to changes in the temperature thereof is freely allowed during operation of the machine.

2. The machine defined in claim 1 in which:
   said first means comprises a rigid material receiving conduit in communication with said outlet opening, said conduit being fixed with respect to said base at a point remote from said housing and including a slip joint at said housing for freely allowing changes in the length of said conduit due to heating thereof without transversely moving said housing.

3. In a machine for plasticizing and feeding plastic material, the combination comprising:
   a base;
   an elongated screw housing having an axially aligned screw chamber;
   transverse inlet and outlet openings in communication with said screw chamber at axially spaced locations therein;
   an elongated screw snugly but rotatably disposed in said chamber for moving material from said inlet opening to said outlet opening, said screw being mounted adjacent one end thereof for at least limited axial sliding movement with respect to said housing;
   first means for fixing said housing adjacent said outlet opening against axial movement with respect to said base;
   second means for transversely supporting said housing adjacent said inlet opening and for allowing axial sliding motion of said housing with respect to said base;
   feeding means for supplying said inlet opening with material to be plasticized, said feeding means being supported in fixed relation to said inlet opening; and
   drive means for rotatably driving said screw;
   whereby independent axial expansion and contraction of said screw and housing due to changes in temperature thereof is freely allowed during operation of the machine.

4. In a machine for plasticizing and feeding plastic material, the combination comprising:
   a base;
   an elongated screw housing having an axially aligned screw chamber;
   transverse inlet and outlet openings in communication with said screw chamber at axially spaced locations therein;
   an elongated screw snugly but rotatably disposed in said chamber for moving material from said inlet opening to said outlet opening, said screw being arranged for at least limited axial sliding movement with respect to said housing;
   first means for fixing said housing adjacent one of said inlet and outlet openings against axial movement with respect to said base;
   second means for transversely supporting said housing adjacent the other of said inlet and outlet openings for allowing axial sliding motion of said housing with respect to said base;
   feeding means for supplying said inlet opening with material to be plasticized; and
   drive means for rotatably driving said screw;
   whereby independent axial expansion and contraction of said screw and housing due to changes in the temperature thereof is freely allowed during operation of the machine.

5. The machine defined in claim 4, in which:
   said second means includes a plate member fixedly secured to said screw housing in sliding engagement with a bearing plate comprising a portion of said base, said bearing plate having an elongated guide groove therein substantially parallel to the longitudinal axis of said elongated screw, and said plate member having a guide projection fixedly secured thereto and slideably received within said guide groove for permitting axial sliding of one end of said housing with respect to said base.

6. The machine defined in claim 5, in which:
   said drive means for rotatably driving said screw is positioned adjacent the inlet opening and is secured to the end of said screw adjacent said inlet opening for axially fixing said end of the screw with respect to said base.

7. The machine defined in claim 4, further including:
   conduit means in communication with said outlet opening and including a slip joint at said housing for freely allowing changes in the length of said conduit due to heating thereof without transversely moving said housing.

References Cited

UNITED STATES PATENTS

| 2,359,840 | 10/1944 | Goesling | 18—30 |
| 2,705,342 | 4/1955 | Hendry | 18—30 |
| 2,705,343 | 4/1955 | Hendry | 18—30 |
| 3,108,326 | 10/1963 | Thiel | 18—30 |
| 3,245,115 | 4/1966 | Ecklund | 18—30 XR |

WILLIAM J. STEPHENSON, *Primary Examiner.*

UNITED STATES PATENT OFFICE
CERTIFICATE OF CORRECTION

Patent No. 3,372,434                                              March 12, 1968

James W. Hendry

It is certified that error appears in the above identified patent and that said Letters Patent are hereby corrected as shown below:

Column 1, lines 34 and 35, "In the past, the screw, screw opening and outlet passage of such machines were relatively short and longitudinally ex-" should read -- In the past, it has been a common practice to soften or plasticize granular material by frictionally work- --.

Signed and sealed this 9th day of September 1969.

(SEAL)
Attest:

Edward M. Fletcher, Jr.                            WILLIAM E. SCHUYLER, JR.
Attesting Officer                                              Commissioner of Patents